United States Patent [19]

Gijzen et al.

[11] Patent Number: 4,833,666
[45] Date of Patent: May 23, 1989

[54] DISC-RECORD PLAYER SUITABLE FOR SCANNING DISC OF DIFFERENT TYPES

[75] Inventors: Wilhelmus A. H. Gijzen, Eindhoven, Netherlands; Michel H. F. Decoster, Hasselt, Belgium; Eduard Camerik, Eindhoven, Netherlands

[73] Assignee: U.S. Philips Corporation, New York, N.Y.

[21] Appl. No.: 131,147

[22] Filed: Dec. 10, 1987

[30] Foreign Application Priority Data

Dec. 24, 1986 [NL] Netherlands ................ 8603297

[51] Int. Cl.⁴ .................... G11B 17/04; G11B 23/02
[52] U.S. Cl. .................................. 369/75.2; 369/265
[58] Field of Search .......................... 369/75.2, 265

[56] References Cited

U.S. PATENT DOCUMENTS 4,337,533  6/1982  Ando et al. .................. 369/265
4,410,971 10/1983  Eisemann ..................... 369/265

FOREIGN PATENT DOCUMENTS

903220  12/1985  Belgium .
26152    4/1981  European Pat. Off. .
228738   7/1987  European Pat. Off. .
59-231784 12/1984 Japan .
98826    4/1923  Switzerland .
2093253  8/1982  United Kingdom .

Primary Examiner—Steven L. Stephan
Attorney, Agent, or Firm—F. Brice Faller

[57] ABSTRACT

Disc player includes a housing with a frame (11) carrying a scanning device and a disc-drive means for driving discs of different types. Loading mechanism includes a drawer (51) which is movable along guide means between an extended position and a retracted position to move a disc towards and away from the disc-drive means where a movable disc-pressure member (99) presses the disc against the disc-drive means. The disc-drive means comprises a first turntable which is fixedly supported relative to the frame and a second turntable (19) which is movable relative to the frame and can be positioned on the first turntable. A movable holder (21) can be actuated by the loading mechanism to position the second turntable on and remove it from the first turntable.

10 Claims, 7 Drawing Sheets

DISC-RECORD PLAYER SUITABLE FOR SCANNING DISC OF DIFFERENT TYPES

BACKGROUND OF THE INVENTION

The invention relates to a disc-record player suitable for scanning disc-shaped records of different types, comprising a housing with a frame which carries a scanning device and a disc-drive means for driving discs of different types. The housing has a front side with a front opening and a loading mechanism including a drawer which is movable along guide means through the front opening between an extended position and a retracted position for moving the record towards and away from the disc-drive means where a movable disc-pressure means presses the disc against the disc-drive means. Such a disc-record player, intended for the contactless scanning of audio discs and video discs, is known and is commercially available.

The disc-drive means of the known disc-record player is disclosed in British Patent Application No. GB 2,137,797 and comprises two turntables of different size which are supported in a common supporting member and can each be brought into a playing position for supporting a specific type of disc. For this purpose a pivoting motor enables the supporting member to be pivoted about a fixed spindle of the frame between the first position, in which one of the turntables is in the playing position, and a second position, in which the other turntable is in the playing position. In the playing position the turntables are each driven by a separate drive motor.

In the known disc-record player the pivotable supporting member with the two turntables and the associated motors occupy a comparatively large amount of space, so that the disc-record player is excessively bulky. Moreover, the use of a pivoting motor and two drive motors is expensive, and the use of such a construction necessarily leads to a substantial increase in weight of the disc-record player.

SUMMARY OF THE INVENTION

The disc-drive means includes a first turntable which is fixedly supported relative to the frame and a second turntable which is movable relative to the frame and which can be positioned on the first turntable, means which can be actuated by the loading mechanism being provided to position the second turntable on and remove it from the first turntable.

When the inventive steps are applied only one drive motor is needed for driving both turntables and a pivoting motor as needed in the known disc-record player is dispensed with. Consequently, the disc-record player in accordance with the invention can be of lighter construction and of smaller dimensions than the known disc-record player.

In the disc-record player in accordance with the invention the first turntable may have a smaller diameter than the second turntable and may be adapted to center, support and rotate an optical disc containing audio information (CD) or audio and video information (CDV). The second turntable may then be adapted to center, support and rotate an optical disc containing video information (LV).

The means actuated by the loading mechanism may comprise a holder for the second turntable, which holder is movable between a first position, in which the second turntable is situated on the first turntable, and a second position, in which the second turntable is situated at a distance from the first turntable. The holder is dimensioned in such a way that in the playing position, i.e. when the second turntable is positioned on the first turntable, the second turntable is not in contact with the holder, but is supported by the holder during the movement of the holder between its first and its second position.

The holder may have two parallel side walls which extend transversely of the front of the housing, which side walls are formed with slots having slot entrances, and having portions which are inclined downwardly viewed from the front of the housing. The drawer can be provided with a lever mechanism with pins which are movable between a first position, in which the pins extend at least substantially transversely of the side walls of the holder and during the inward movement of the drawer, via the slot entrances, engage the slots in the side walls of the holder occupying in its first position, and a second position, in which the pins have moved outwards relative to the first position and during the inward movement of the drawer do not engage the slots of the holder occupying its first position. The frame may carry guide elements which cooperate with guide-wall portions of the holder during a movement of the holder between its first position and its second position.

Suitably, the lever mechanism comprises at least one scanning element for detecting the type of disc present on the drawer, said pins of the lever mechanism automatically assuming either the first position or the second position depending on the detected type of disc.

DETAILED DESCRIPTION OF THE PREFERRED EMBODIMENT

Figure 6:
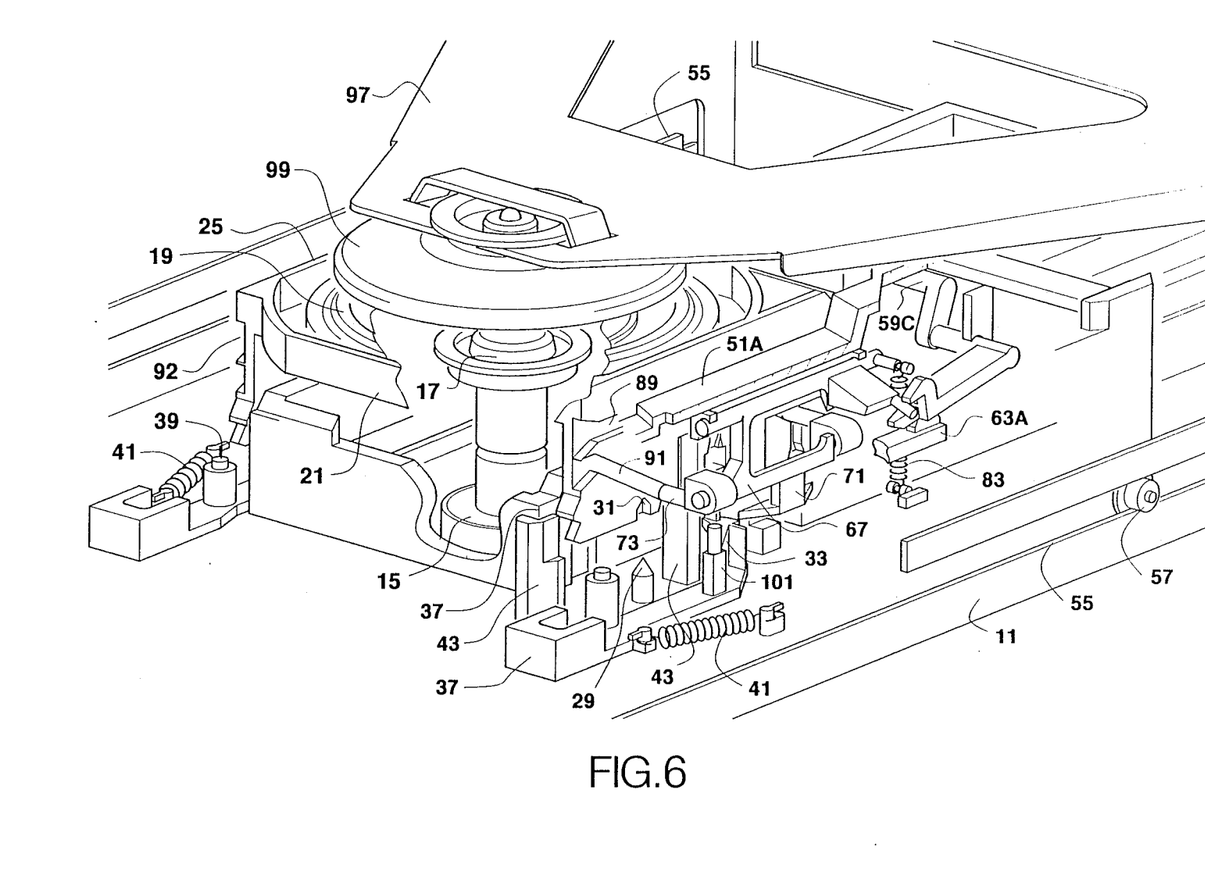
FIG. 6 shows the same detail as FIG. 5, the drawer being slid inwards over a limited further distance.

Referring to FIG. 6, the disc-record player comprises a housing 1 having a front side 3 in which a front opening 5 is formed. The front side 3 further carries control keys 7 and program keys 9. The housing 1 accommodates a frame 11, an optical scanning device and a disc-drive means. The disc-drive means comprises one drive motor 15, which is secured to the frame 11, a first turntable 17, which is mounted on the motor shaft of the motor 15, and a second turntable 19, which is arranged in a holder 21 and which can be positioned on the first turntable 17.

Figure 2:
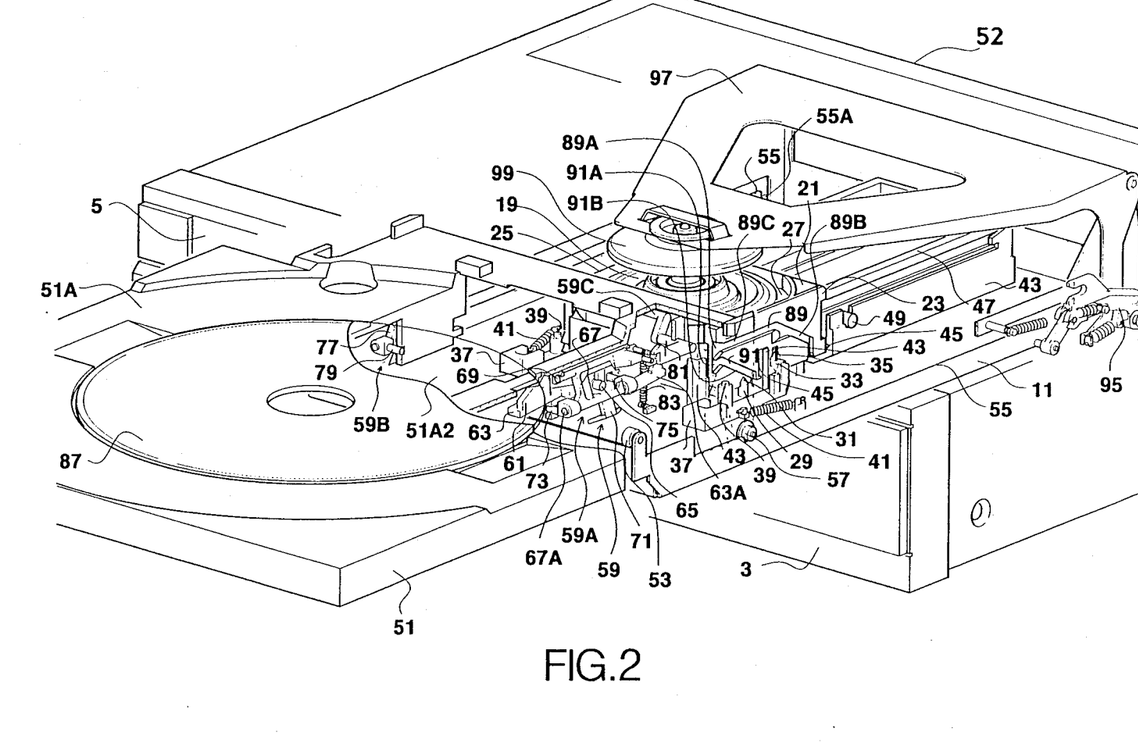
FIG. 2 is a cut-away perspective with the drawer in its fully extended position and an optical disc containing video information situated on the drawer.
Figure 3:
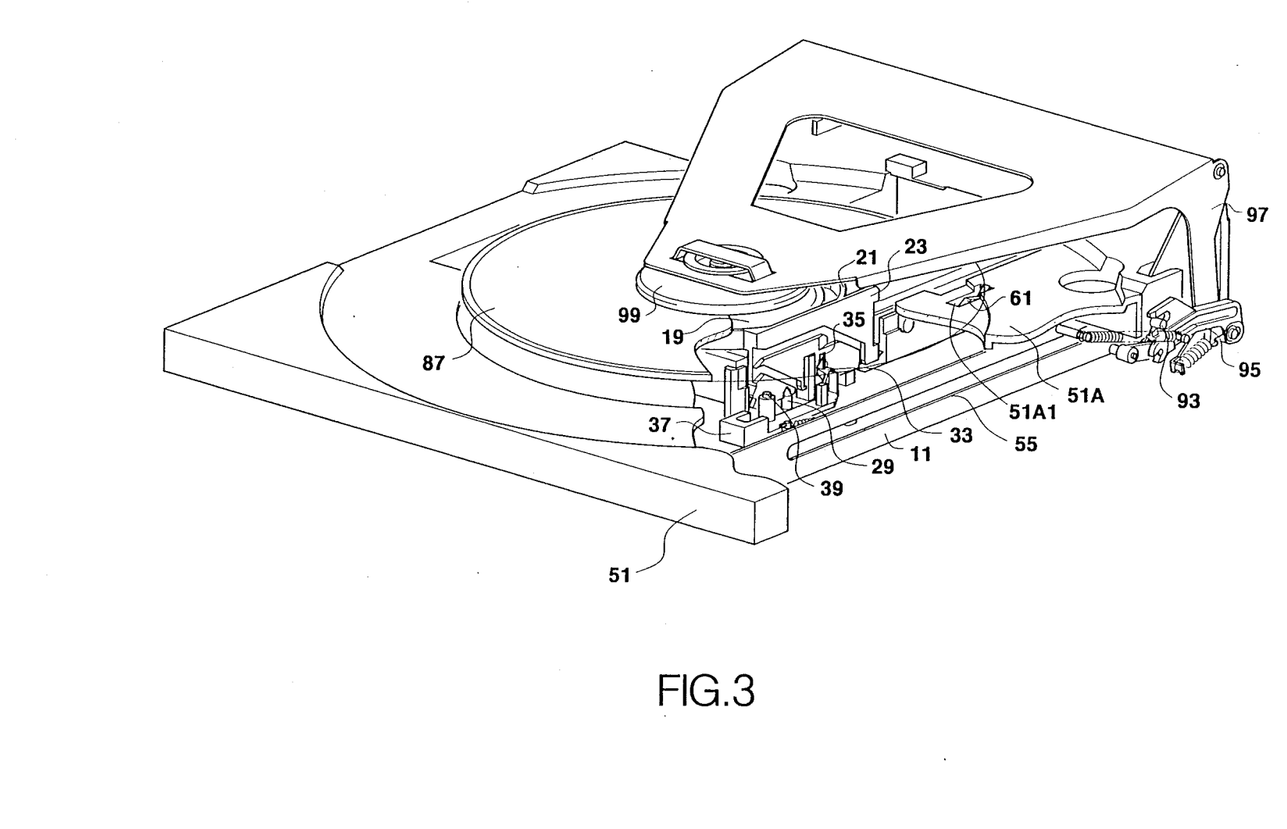
FIG. 3 is a perspective of the drawer in the fully retracted position and an optical disc with video information situated on the second turntable.
Figure 7:
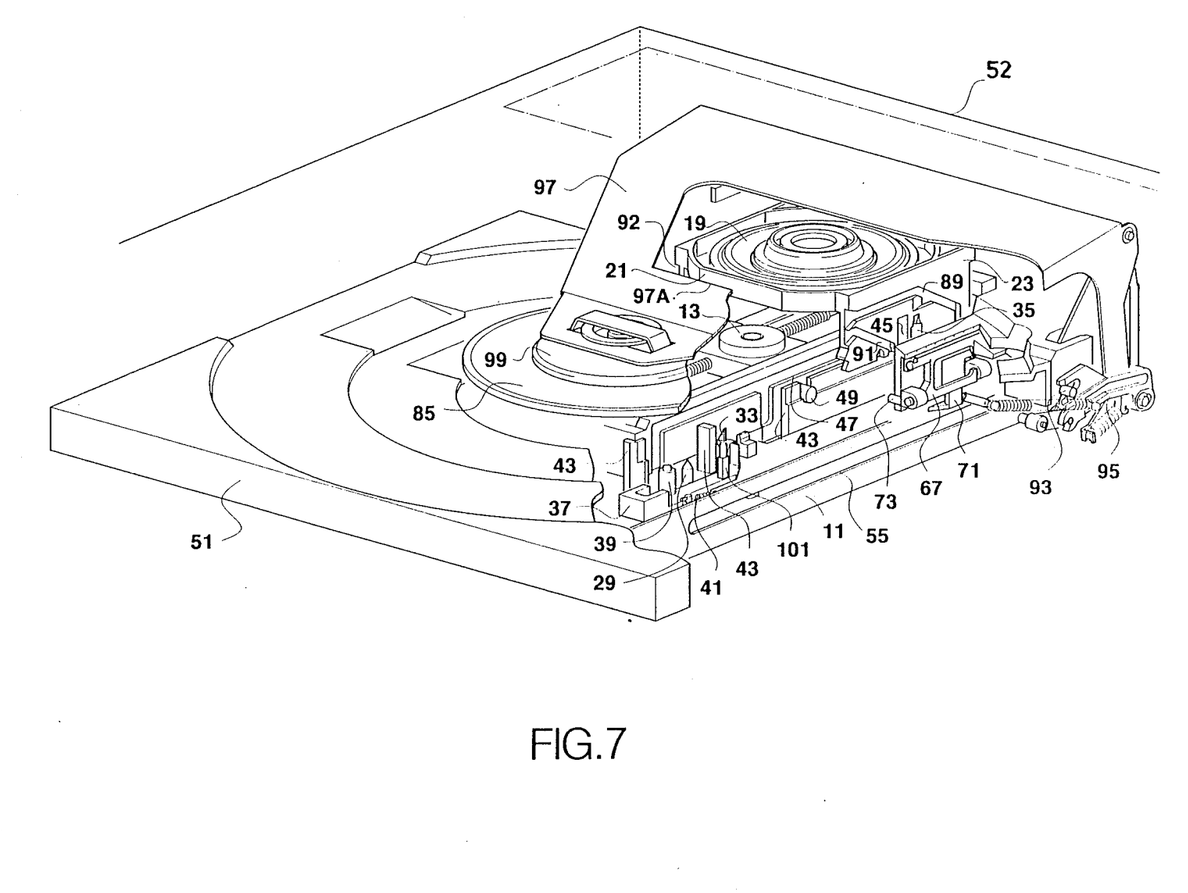
FIG. 7 shows the same part of the disc-record player as shown in FIG. 4, the drawer being shown in the fully retracted position and an optical disc containing audio information being situated on the first turntable.

The first turntable 17 has a centering mandrel and a supporting surface which are dimensioned to center and rotate compact discs. The second turntable 19 has larger dimensions and is adapted to center and rotate larger optical discs, namely Laservision discs. The holder 21 is of rectangular shape and has two parallel side walls 23 and 25 and a supporting flange 27 for supporting the second turntable 19. The holder 21 is movable between a first position, as is shown in FIG. 2, and a second position, as is shown in FIGS. 3 and 7. In the first position the second turntable 19 is situated slightly above the supporting flange 27 of the holder 21, whilst the upper side of the holder 21 is disposed slightly below a disc situated on the turntable 19, so that the turntable 19 and a disc which it supports cannot contact the holder 21.

Figure 5:
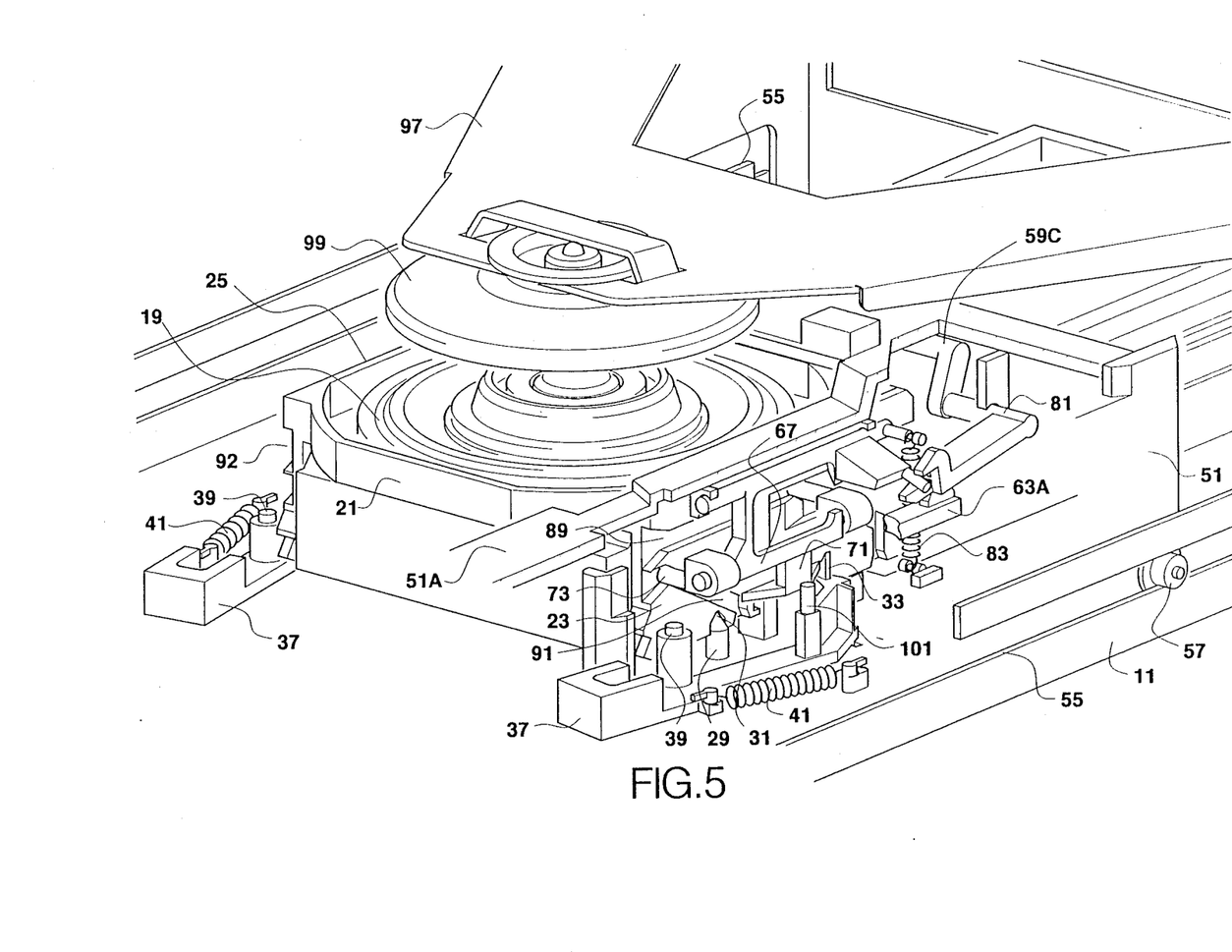
FIG. 5 shows a detail of the part of the disc-record player shown in FIG. 4, the drawer being slid inwards over limited distance.

Referring to FIGS. 2 and 5, a conical centring element 29 is secured to the frame 11 near each side wall 23 and 25 to cooperate with a centering recess 31 in each side wall. The drawing shows only one element 29 and one recess 31. The elements 29 engage the recesses 31 in the first position of the holder 21 to position the holder 21 accurately.

In the first position the holder 21 is retained by two latching elements 33 which each engage a latching aperture 35 in the side walls 26 and which are each secured to a latching arm 37. The latching arms 37 are each situated near one of the side walls 23 and 25 and are pivotable about a journal 39 mounted on the frame. Two tension springs 41 which act between the latching arms 37 and the frame 11 urge the latching elements 33 into apertures 35 in the first position of the holder 21. The drawing shows only one element 33 and one aperture 35.

In order to move the holder 21 out of the first position the latching arms 37 must be pivoted against the force of the springs 41 until the latching elements 33 are fully disengaged from the apertures 35. Moving the holder 21 between the first position and the second position is effected along guide elements 43 which are arranged on the frame 11 on opposite sides of the holder 21. At the location of the side walls 23 and 25 the holder 21 carries a plurality of guide-wall portions 45 which are adapted to cooperate with the guide elements 43 on the frame 11. The drawing shows only the guide elements and the guide wall portions at one side of the holder 21.

The optical scanning device comprises a lens system 13 for concentrating a radiation beam to form a radiation spot and is movable in a tilting device 47 for the purpose radially following the tracks on an optical disc. The tilting device 47 is supported in the frame 11 and is pivotable to a limited extent about a pivoting spindle 49. Examples of an optical scanning device and a tilting device are described in Netherlands Patent Application No. 8500592 (U.S. application Ser. No. 837,923; herewith incorporated by reference).

Figure 1:
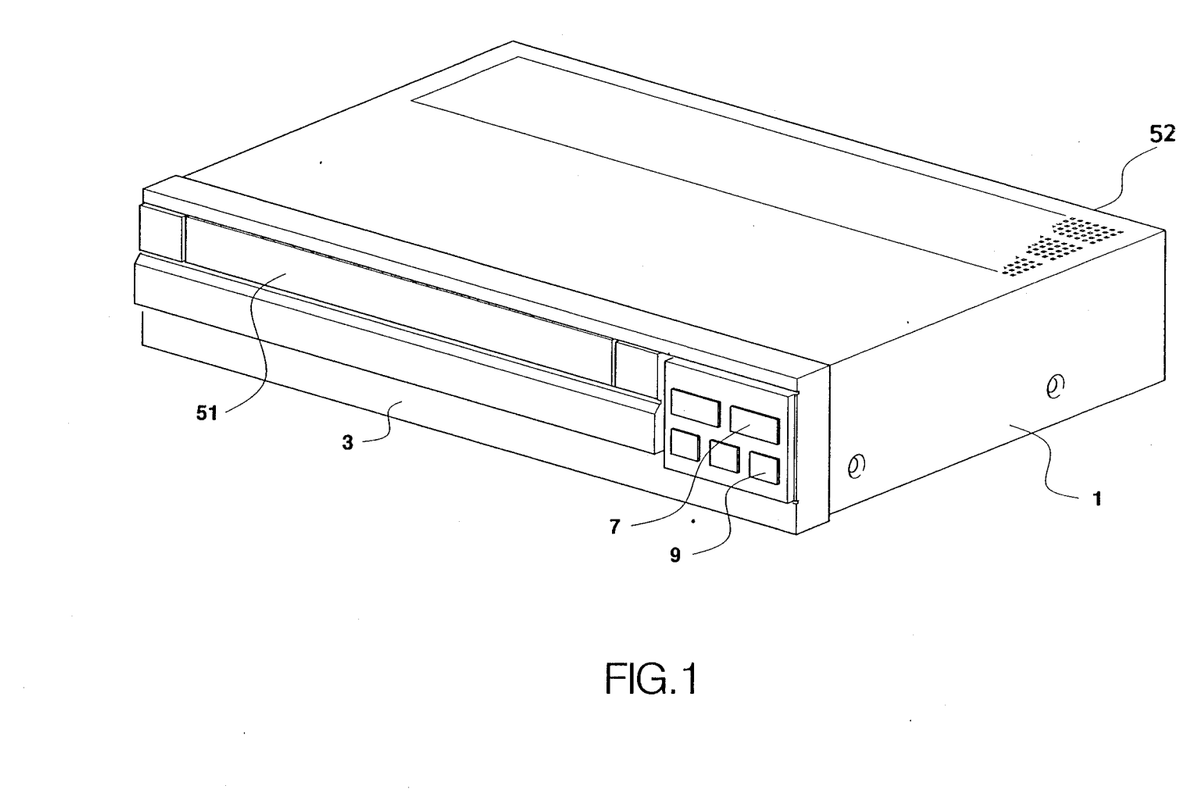
FIG. 1 is a perspective view of an optical disc-record player.
Figure 4:
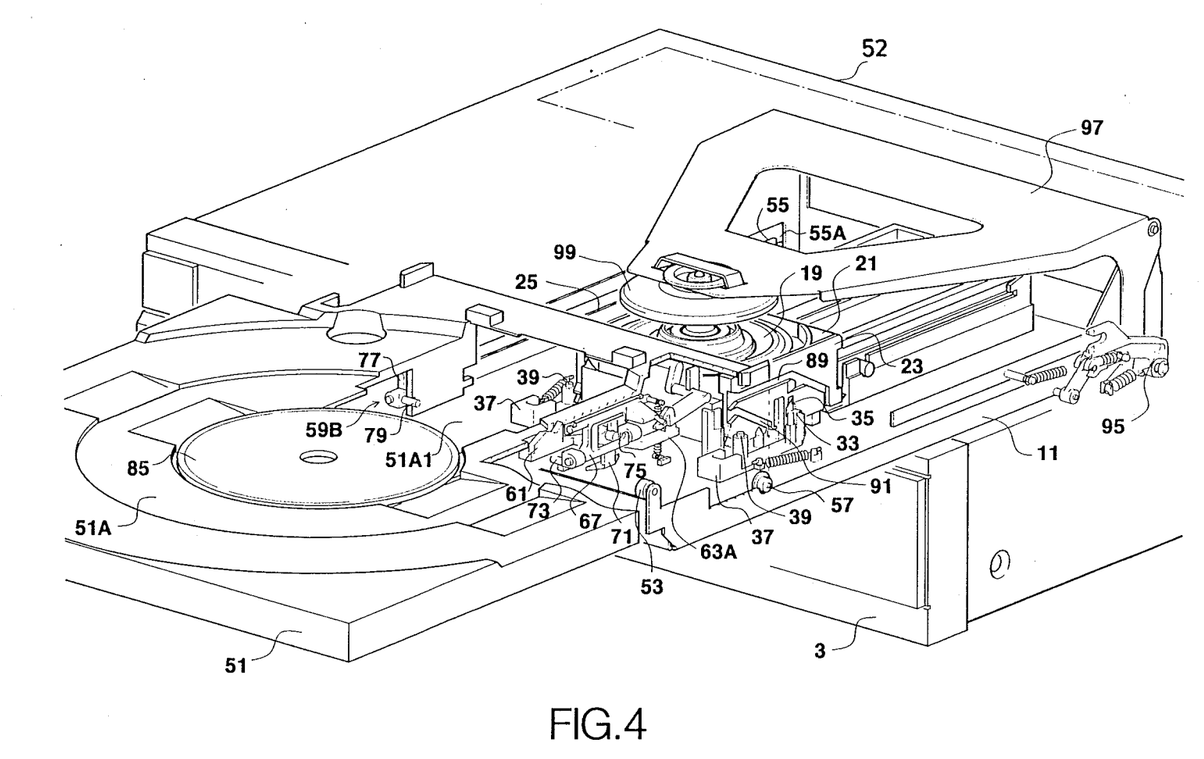
FIG. 4 is a cut-away perspective with the drawer being in the fully extended position and an optical disc containing audio information situated on the drawer.

Referring to FIGS. 2, 3 and 4, the disc-record player further comprises a loading mechanism including a drawer 51 having a profiled bottom 51A for supporting the optical discs. The drawer 51 can be moved substantially rectilinearly through the front opening 5 between an extended position, as is shown in FIGS. 2 and 4, and a retracted position, as is shown in FIGS. 1, 3 and 6. During its inward and outward movement the drawer 51 is guided on both sides by means of a roller 53 and a guideway 55 on the frame 11, a wheel 57 mounted on each side of the drawer cooperating with one of the guideways 55. The drawing shows only one of the rollers 53 and one of the wheels 57. Near the rear 59 of the housing 1 the guideways 55 have a vertical guide portion 55A for the downward movement of the retracted drawer to position an optical disc on the first turntable 17 or the second turntable 19. The drawer 51, which may be partly slid in by hand, is coupled to an electric motor, not shown, for moving the drawer fully inwards and outwards. For completeness' sake reference is made to Netherlands Patent Application No. 8603,296 (corresponding U.S. application Ser. No. 862,224 herewith incorporated by reference), which describes a suitable construction for driving the drawer.

Referring to FIGS. 2, 4, and 5 lever mechanism 59 secured to the drawer 51 includes a sensing element 61 which is movable through an aperture 51A1 in the bottom 51A and cooperates with holder 21. The lever mechanism 59 includes two lever systems 59A and 59B and a coupling lever 59C. Since the lever systems are in principle identical, only one of the systems is shown in detail. The system 59A comprises a first lever 63 which is pivotable about a spindle 65 and a second lever 67 which is pivotable about a spindle 69. The second lever 67 comprises a release element 71 and two pins 73 and 75 which are pivotable about a journal 67A. the system 59B comprises a second lever 77 which corresponds to the second lever 67 but which carries only one pivotable pin 79. The system 59B does not comprise a first lever. The second levers 67 and 77 are coupled to one another by coupling lever 59C, which is pivotable about a spindle 81. The first lever 63 with the sensing element 61 comprises an end portion 63A which is adapted to cooperate with the second lever 67 and the coupling lever 59C. A tension spring 83 arranged between the second lever 67 and a bottom portion of the drawer 51 ensures that the sensing element 61 projects slightly from the bottom 51A of the drawer 51 if the extended drawer does not support a disc or carries a compact disc 85, which because of its dimensions cannot actuate the sensing element, as is shown in FIG. 4. In the situation as illustrated in FIG. 4 the pins 73, 75 and 79 and the release elements 71 of the second levers 67 and 77 occupy a first position. However, if as is shown in FIG. 2 a Laservision disc 87 is situated on the drawer 51, the disc is in contact with the sensing element 61, which is pressed downwards by the weight of the disc, causing the first lever 63 and the second levers 67 and 77 to be pivoted through limited angles about their respective spindles. In this situation the pins 73, 75 and 79 and the release elements 71 of the second levers 67 and 77 occupy a second position, which is situated nearer the sides of the drawer 51 than the first position as a result of a small outwardly directed lateral displacement.

Referring to FIG. 5, the holder 21 is formed with a number of slots equal to the number of pins 73, 75, 79; this means that in the present example three slots are present. Of these slots two slots 89 and 91 are formed in the side wall 23 and one slot 92 is formed in the side wall 25. The last-mentioned slot 92 has a shape corresponding to that of the slot 89. The slots each have a slot entrance opening towards the front 3 of the housing and an inclined slot portion. The slot entrances of the slots 89 and 91 bear the reference numerals 89A and 91A respectively and the inclined slot portions of the slots 89 and 91 bear the numerals 89B and 91B respectively. The slots 89 further has a horizontal slot portion 89C. The slots in the holder 21 and the pins 73, 75 and 79 of the lever mechanism 59 of the drawer 51 are so positioned relative to each other that the pins 73, 75 and 79, when they occupy their first positions, can engage the slots 91, 89 and 92 respectively during the inward movement of the drawer 51.

The manner in which the lever mechanism 59 of the drawer 51 cooperates with the holder 21 will be explained by describing some possible uses of the optical disc player in accordance with the invention. A first possibility is described with reference to FIGS. 2 and 3. As is shown in FIG. 2, a Laservision disc 87, which is larger than a compact disc, is situated on the extended drawer 51. The disc 87 presses on the plastic sensing element 61, so that the pins 73, 75 and 79 as well as the release elements 71 on both sides of the drawer 51 occupy the second position. The second turntable 19 is disposed on the first turntable, the holder 1 surrounding the second turntable 19 with clearance. The holder 21 is supported on the frame 11 and is latched in a fixed position relative to this frame by the latching elements 33 on the latching arms 37. When the drawer 51 containing the disc 87 is slid into the housing the lever mechanism 59 moves past both sides of the holder 21 at a specific instant, without the lever mechanism 59 coming into contact with the holder 21 because the pins 73, 75 and 79 in their second positions do not move into but past the slots 91, 89 and 92 in the holder 21 during the inward movement of the drawer 51. Moreover, the release elements 71, which are in their second positions, move past the latching arms 37 without making contact with the arms 37 during the inward movement of the drawer 51. This means that the holder 21 remains in its latched position relative to frame 11 during the inward movement of the drawer 51 and that the second turntable 19 remains positioned on the first turntable 17. The bottom 51A of the drawer 51 has an opening 51A2 which is large enough to allow the drawer 51 to be moved past the holder 21. In the fully retracted position of the drawer 51 as shown in FIG. 3 the disc 87 is disposed on the second turntable 19, whose supporting surface is situated slightly above the holder 21, so that the disc 19 can rotate without contacting the holder 21. Since at the end of the inward movement the drawer 51 has been moved vertically downwards along the guide portions 55A some clearance is obtained between the drawer 51 and the disc 87 on the second turntable 19. During this vertical movement of the drawer 51 a bellcrank lever mechanism 95 is actuated via two pins 93 situated on opposite sides of the drawer 51, which mechanism is coupled to a disc-pressure mechanism 57 comprising a discpressure member 99, so that the disc is pressed against turntable 19 with a specific force. The driving torque of the first turntable 17 can be transmitted to the second turntable 19 by a suitable choice of the materials of the turntable portions which are in contact with one another. In order to prevent the two turntables from slipping relative to each other, additional provisions may be taken, such as coupling the two turntables via teeth. When the drawer 51 is moved from the retracted position to the extended position, the disc-pressure member 99 is moved away from the optical disc 87. The disc 87 is then lifted off the turntable 19 by the bottom 51A of the drawer 51 and is moved outwards by means of the drawer 51.

A second possibility of using the disc-record player in accordance with the invention will be described with reference to FIGS. 4 to 7. As is shown in FIG. 4, the extended drawer 51, carries a compact disc 85 whose dimensions are so small that the sensing element 61 is situated beyond the disc circumference and consequently is not in contact with the disc 85. The pins 73, 75 and 79 as well as the release elements 71 of the lever mechanism 59 therefore occupy the first position. The second turntable 19 is positioned on the first turntable 17, the holder 21 surrounding the second turntable 19 with clearance. The holder 21 rests on the frame 11 and is latched relative to this frame by the latching elements 33 on the latching arms 37. When the drawer with the disc 85 is slid into the housing, the pins 73, 75 and 79 engage the slots 91, 89 and 92 respectively in the holder 21 when the drawer 51 is partly retracted, whilst practically at the same time the release elements 71 contact the release pins 101 of the latching arms 37, causing the latching arms 37 to perform a constrained pivotal movement in such a direction that the latching elements 33 become disengaged from the latching recesses 35 in the side walls 23 and 25 of the holder 21. As the inward movement of the drawer 51 proceeds the holder 21 is first lifted by the pins 73, 75 and 79 which engage the slots (see FIG. 6), and is subsequently moved towards the rear 52 of the housing 1 (see FIG. 7). During this displacement of the holder 21 the guide wall portions 45 of the holder 21 move past the guide elements 43 of the frame 11, and the second turntable 19 is lifted off the first turntable 17 and moved towards the rear 52 of the housing 1 together with the holder 21. In the fully retracted position of the drawer 51, as is shown in FIG. 7, the disc 85 is situated on the first turntable 17 and the holder 21 with the second turntable 19 is kept away from the disc 85 on the first turntable. The holder 21 is then retained between the rear wall 52 of the housing and a wall portion 97A of the disc-pressure mechanism 97. Since at the end of the inward movement the drawer 51 is vertically lowered along the guide portions 55A, some clearance is obtained between the drawer 51 and the optical disc 85 on the first turntable 17. In a way similar to that described with reference to FIG. 3 the pressure member 99 is moved towards the disc 85 during the vertical movement of the drawer 51, so that this disc is pressed against the turntable 17 in the playing position. When the drawer 51 is moved from the retracted position to the extended position, the discpressure member 99 is moved away from the disc 87, and the disc 87 is lifted off the turntable 17. The disc 87 is then moved outwards by means of the drawer 51 and the holder 21 with the second turntable 19 is moved towards the first turntable 17, after which the second turntable 19 is positioned on the first turntable 17 and the holder 21 is latched.

What is claimed is:

1. A disc record player for scanning disc records of different types, comprising
   a housing having a front and an opposed rear, said front having an opening therein, said housing having a frame fixed therein,
   disc drive means comprising a first turntable for receiving a disc of a first type and a second turntable for receiving a disc of a second type, said first turntable being fixedly supported relative to the frame, said second turntable being movable relative to the frame,
   a loading mechanism for loading a disc on said disc drive means, said loading mechanism comprising a drawer which is movable through said front opening between an extended position away from said disc drive means and a retracted position toward said disc drive means, a holder for said second turntable, which holder is movable between a first position, in which the second turntable is situated on the first turntable, and a second position in which the second turntable is toward the rear of the housing remote from the first turntable, movement of said holder being actuated by said loading mechanism.

2. A disc-record player as claimed in claim 1, characterized in that the holder comprises two parallel side walls which extend transversely of the front of the housing, which side walls are formed with slots having slot entrances and having portions which are inclined downwardly viewed from the front of the housing, in that the drawer is provided with a lever mechanism with pins which are movable between a first position, in which the pins extend at least substantially transversely of the side walls of the holder and during the inward movement of the drawer, via the slot entrances, engage the slots in the side walls of the holder occupying its first position, and a second position, in which the pins have moved outwards relative to the first position and during the inward movement of the drawer do not engage the slots in the holder occupying its first position, and in that on the frame carries guide elements which cooperate with guidewall portions of the holder during a movement of the holder between its first position and its second position.

3. A disc-record player as claimed in claim 2, characterized in that at least one of said side walls of the holder has two of said slots, the slot entrances being disposed in different planes, the inclined slot portions being situated one behind the other viewed from the front of the housing, and at least one of the slots comprising a horizontal slot portion which extends between the slot entrance and the inclined slot portion, and in that in the extended position of the drawer the pins of the lever mechanism are disposed in planes corresponding to the planes in which the slot entrances of the slots in the side walls of the holder are situated in the first position of said holder.

4. A disc-record player as claimed in claim 1, characterized in that the frame carries centring elements which engage centring apertures in the side walls of the holder in the first position of the holder.

5. A disc-record player as claimed in claim 1, characterized in that the latching means are provided for retaining the holder in its first position relative to the frame.

6. A disc-record player as claimed in claim 5, characterized in that said latching means comprise two latching arms, which are situated on opposite sides of the holder and which are pivotable relative to the frame, and two resilient elements which are secured to the latching arms, the latching arms comprising latching elements which under spring force engage apertures in the side walls of the holder in the first position of the holder.

7. A disc-record player as claimed in claim 6, characterized in that the lever mechanism of the drawer comprises two release elements which are movable between a first position, in which during the inward movement of the drawer the release elements cooperate with release wall portions of the latching arms to disengage the latching elements from said apertures in the side walls of the holder which occupies its first position, and a second position, in which the release elements have moved outwards relative to the first position and during the inward movement of the drawer do not cooperate with said release wall portions of the latching arms.

8. A disc-record player as claimed in claim 2, characterized in that the lever mechanism comprises at least one sensing element for detecting the type of disc present on the drawer, said pins of the lever mechanism automatically assuming either the first position or the second position depending on the detected type of disc.

9. A disc-record player as claimed in claims 8, characterized in that in addition to said pins said release elements of the lever mechanism also automatically assume the first position or the second position depending on the type of disc detected by the sensing element.

10. A disc-record player as claimed in claim 7, characterized in that in addition to said pins said release elements of the lever mechanism also automatically assume the first position or the second position depending on the type of disc detected by the sensing element.

* * * * *